United States Patent
Liu et al.

(10) Patent No.: US 8,095,766 B2
(45) Date of Patent: Jan. 10, 2012

(54) METHOD AND SYSTEM FOR APPROXIMATING OBJECT SIZES IN AN OBJECT-ORIENTED SYSTEM

(75) Inventors: Tian Cheng Liu, Beijing (CN); Susan P Paice, Eastleigh (GB); Andrew J Schofield, Eastleigh (GB); Qi Ming Teng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 871 days.

(21) Appl. No.: 12/098,574

(22) Filed: Apr. 7, 2008

(65) Prior Publication Data

US 2009/0254706 A1    Oct. 8, 2009

(51) Int. Cl.
*G06F 12/00* (2006.01)
*G06F 13/28* (2006.01)

(52) U.S. Cl. ........................................ 711/171; 711/118
(58) Field of Classification Search .................. 711/171, 711/118
See application file for complete search history.

(56) References Cited

U.S. PATENT DOCUMENTS

| | | | | |
|---|---|---|---|---|
| 5,561,786 A | * | 10/1996 | Morse | 711/170 |
| 5,797,007 A | * | 8/1998 | Erickson et al. | 712/300 |
| 6,490,670 B1 | | 12/2002 | Collins et al. | |
| 6,510,504 B2 | * | 1/2003 | Satyanarayanan | 711/170 |
| 7,036,118 B1 | | 4/2006 | Ulery et al. | |
| 7,269,705 B1 | * | 9/2007 | Seidl et al. | 711/170 |
| 2004/0133759 A1 | | 7/2004 | Sckiguchi | |
| 2005/0240641 A1 | | 10/2005 | Kimura et al. | |

OTHER PUBLICATIONS

Vladimir Roubtsov, Sizeof for Java: Object sizing revisited, JavaWorld.com (http://www.javaworld.com/javaworld/javaqa/2003-12/02-qa-1226-sizeof.html), Dec. 26, 2003, pp. 1-10, United States.

* cited by examiner

*Primary Examiner* — Stephen Elmore
*Assistant Examiner* — Mark Giardino, Jr.
(74) *Attorney, Agent, or Firm* — King & Spalding

(57) ABSTRACT

A method and system for increasing a system's performance and achieving improved memory utilization by approximating the memory sizes that will be required for data objects that can be deserialized and constructed in a memory cache. The method and system may use accurate calculations or measurements of similar objects to calibrate the approximate memory sizes.

14 Claims, 3 Drawing Sheets

METHOD AND SYSTEM FOR APPROXIMATING OBJECT SIZES IN AN OBJECT-ORIENTED SYSTEM

BACKGROUND OF THE INVENTION

1. Field of the Invention

This invention is related to object-oriented programming environments, and more particularly to the calculation of the memory size required by an object.

2. Background

An object-oriented programming ("OOP") environment is often described as a collection of cooperating objects, as opposed to a traditional programming environment in which a program may be seen as a group of tasks to compute (subroutines or functions). In OOP, a "class" is an abstract construct that provides a blueprint defining the nature of an object that can be created. Objects are therefore created based on the structure and definitions of a particular class. In object-oriented programming, an "object" is an instance (or instantiation) of a class and multiple objects (instances) can be created based on the same class. The class object contains a combination of data and the instructions that operate on that data, making the object capable of receiving messages, processing data, and sending messages to other objects. A "cluster" is essentially a group of classes or objects.

In the context of data storage and transmission, serialization is the process of converting an object into a binary form that can be saved on a storage medium (such as disk storage device) or transmitted across a network. The series of bytes in the serialized binary form of the object can be used to re-create an object that is identical in its internal state to the original object (actually, a clone). The opposite of serialization, known as deserialization, is the process by which the serialized binary form can be constructed into an instance of the object.

Each object created in memory requires a portion of the available memory capacity. Some of that memory portion may be comprised of information imposed by the programming environment "overhead" and some of which may be consumed by data contained in the object. Many related objects with references between each other are often used to represent a complex piece of data and are known as clusters. Each constituent object in the cluster can require its own portion of available memory.

The performance cost of reading data from disk storage devices such as hard disk drives is typically much higher than accessing the same data in random access memory (RAM). This is generally contributed to the slow mechanical nature of magnetic disk drives and the slower data transmission paths from a hard disk drive to the memory and microprocessor components. For this reason, higher performance memory (such as RAM) is typically used as a memory cache or data buffer for data that is stored on the hard disk drive. This technique increases performance when the same data is accessed repeatedly and minimizes performance delays caused by retrieving data directly from the hard disk drive when it is required for a processing task. There is an added delay when retrieving objects from the hard disk drive because they are stored in a serialized binary form and must first be deserialized (i.e., "constructed") into instantiated objects before processing. Processing performance is therefore significantly increased when run-time instances of deserialized objects are cached in memory before they are needed, as opposed to being stored only on the hard disk drive in a serialized representation of object clusters.

However, storage capacity on a hard disk drive is typically much cheaper and far greater than that of memory. There is therefore a limited amount of high-performance memory available to be used as a memory cache or data buffer. In determining how to best allocate available memory to maximize performance, it is generally necessary to first determine how much memory will be required by objects under consideration for being deserialized and instantiated in memory.

There is therefore a need to increase performance by deserializing and creating run-time objects in the memory cache but in order to optimize utilization of the limited memory capacity, there is a need to first determine how much memory will be required (and used) by the objects before any such creation takes place.

One simple solution is to calculate accurately the exact amount of memory required for each and every object, but the calculations and processing required to analyze each and every object to make such a determination can prove excessively expensive in performance terms and thus detracts from the benefits of any subsequent performance gains.

By way of example, an Extensible Markup Language (XML) document that has been parsed can be represented as a cluster of related objects. The Document Object Model (DOM) application programming interface allows for navigation of such XML documents wherein the "tree" of "node" objects represent the document's content. However, DOM implementations tend to be memory intensive because the entire document must be loaded (i.e., deserialized) into memory as a tree of objects before access is allowed. Thus, the exact amount of memory required for the tree (cluster) of objects cannot be determined without deserializing it into run-time objects in memory, at least temporarily. This is therefore an expensive operation in terms of performance.

Another possible solution is to cache the object representations in memory in their serialized format, creating the run-time object instances only when they are needed and discarding them from memory as soon as they are no longer required. This strategy is essentially a "half way approach" because by copying only the serialized object representations to memory, no calculations of the size of actual run-time instances of the objects are required. However, performance is only partially improved because each time objects need to be processed, the serialized object representations must first be deserialized into the actual run-time instances of objects, which decreases performance. Thus, while the calculation of the required memory cache for serialized objects is simple and this technique improves performance as opposed not having objects in the memory cache altogether, it will not perform as well as situations where the actual run-time instances of objects are created in the memory cache.

It is therefore the case that where the size of a piece of data on the hard drive disk is known (i.e., the serialized representation of an object), but the size of its representation in memory is much harder to compute (i.e., the run-time instance of the object), it becomes very hard to optimize the use of memory cache where there is a fixed maximum capacity of cache. There is a need for a method that increases performance and achieves an optimal utilization of available memory by deserializing actual run-time instances of objects into memory, but without having to first calculate the exact amount of memory required for each and every object.

SUMMARY OF THE INVENTION

The invention provides a new method and system for calculating memory size requirements of an object, comprising: having a new object that is to be stored in a memory cache or a data buffer, further having a known memory size of a similar object with at least one fixed size component, using the known memory size of the similar object to approximate a memory size required by the new object by determining that at least one fixed size component of the new object is equivalent in size to a respective fixed size component of the similar object, calculating an actual size of any variable sized components of the new object, approximating the total size of the new object, wherein if there is space in the memory cache or data buffer available for the new object, storing the new object in the memory cache or the data buffer.

Additional features and advantages are realized through the techniques of the present invention. Other embodiments and aspects of the invention may be recognized from the description and the drawings.

BRIEF DESCRIPTION OF THE DRAWINGS

The subject matter which is regarded as the invention is particularly pointed out and distinctly claimed in the claim(s) at the conclusion of the specification. The foregoing and other objects, features, and advantages of the invention are apparent from the following detailed description taken in conjunction with the accompanying drawings in which:

The detailed description explains embodiments of the invention, together with the advantages and features, by way of example with reference to the drawings, which are not necessarily drawn to scale.

DETAILED DESCRIPTION OF THE INVENTION

Figure 1:
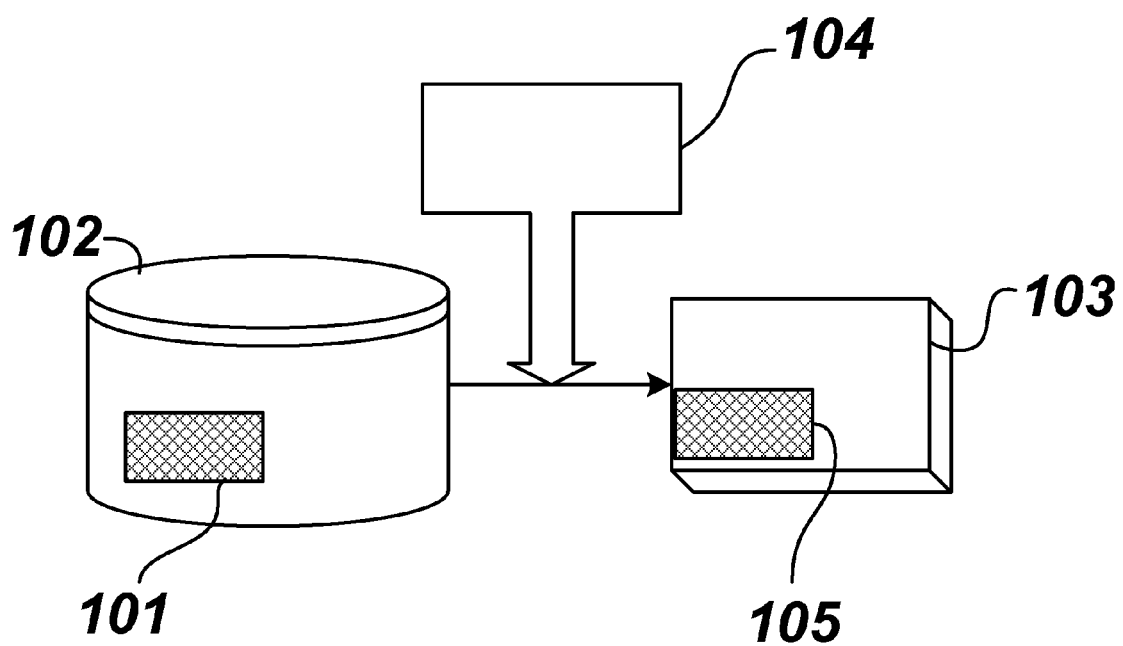
FIG. 1 illustrates the process of analyzing an object's size before it is placed into memory.

FIG. 1 illustrates an embodiment of the invention, wherein as a piece of data 101 is added from storage 102 to a cache in memory 103, the system processor 104 analyzes the piece of data to determine the size required in memory 105 for the data. Considering the data as a cluster of objects, the cluster is traversed to establish the approximate size of its constituent pieces and these are added together to yield the size of the cluster. Often, it will be possible to establish the size of a cluster of objects without traversing it exhaustively based on some properties of the data. There will be a trade-off between the cost of traversing the data and the accuracy of the approximate size calculated.

Typically, the in-memory size is some function of the complexity of the data. For example, in a trivial case, the size of a string of characters can be calculated from the length of the string multiplied by the size of a character, in addition to the overhead of the string itself. For example, a six character string like "Hello!" where each character is represented by an 8 bit value will simply be 6 multiplied by 8, for a total of 48 bits, plus the overhead. In a less trivial case, the size of a table of integers can be calculated if you know the number of integers. For even more complex cases, the principle still holds that there is a viable approximation function calculated based on the content of the data and its structure in memory in addition to any overhead.

There are known algorithms which calculate (with reasonable accuracy, but subject to certain limitations) the memory size of objects in Java-based objects. For example, see Vladimir Roubtsov, Sizeof for Java: Object sizing revisited, JavaWorld.com (Dec. 26, 2003). The claimed advantage of the embodiment of the invention is an algorithm that performs better than the known algorithms by using approximations based on specific measurements. In particular, these measurements can be obtained through the use of an instrumented Java Virtual Machine (JVM).

The embodiment of the invention depends upon being able to calculate the approximate size of a composite object in a relatively accurate fashion. The more accurate the calculation, the better the anticipated increase in performance and optimal memory utilization.

Figure 2:
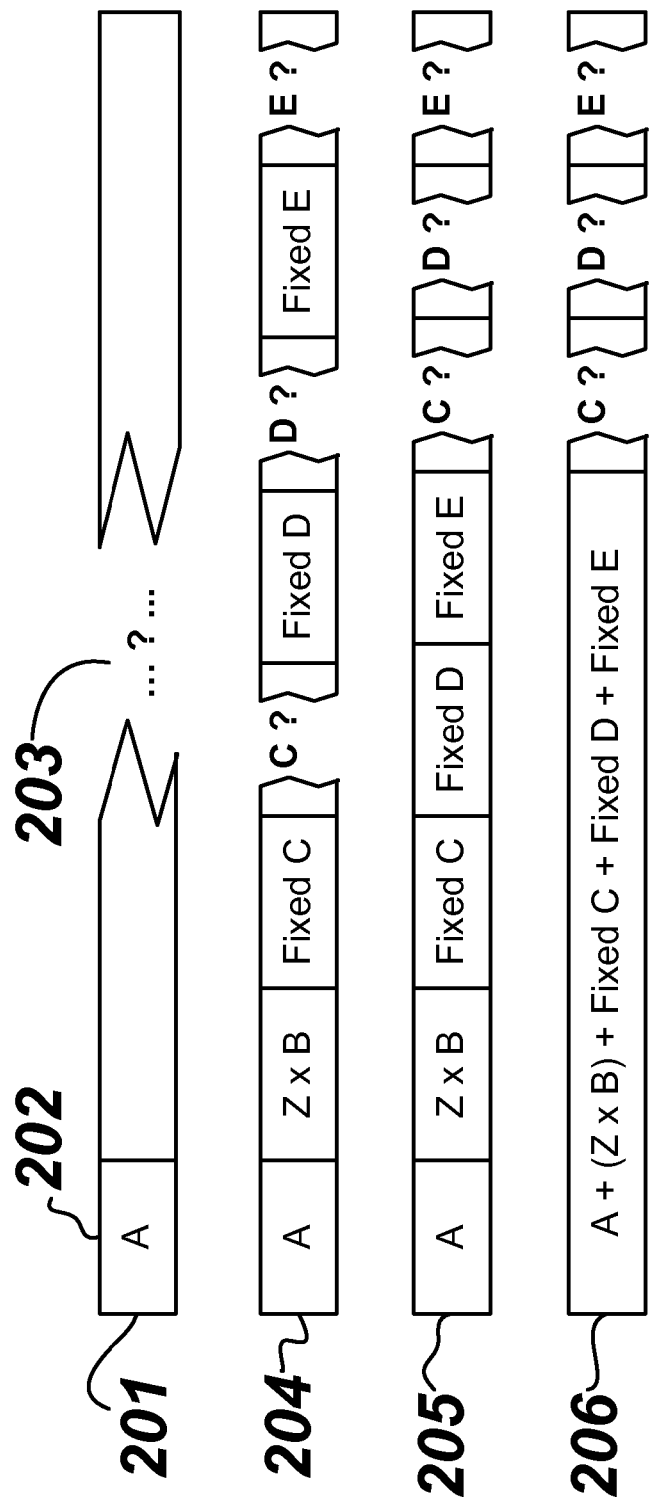
FIG. 2 illustrates one possible process for calculating the size of an object based on known sizes of similar objects, wherein only the size of variable data must still be determined at run-time.

An embodiment of the invention can be applied to an object such as a Java Message Service (JMS) message, as illustrated in FIG. 2. While applicable to many other types of data sought to be placed in memory cache, an embodiment of the invention is clearly suitable to object-oriented data such as that used by a JMS provider that is executed within a JVM. In basic terms, the Java Message Service API is a messaging standard that allows application components based on the Java 2 Platform, Enterprise Edition (J2EE) to create, send, receive, and read messages. It enables distributed communication that is loosely coupled, reliable, and asynchronous. (A complete description of JMS is available on the Sun Microsystems website.)

An empty JMS message is quite complex but its accurate size in memory can be established by measurement or calculation. This can be viewed as a base value for the approximate size of any JMS message, so the approximate size of any JMS message will typically be related to this accurate size of an empty message. For any JMS message which contains only a single string, the relationship between the empty message and the string message is very simple so it is both accurate and cheap to calculate the approximate size of a string message. The memory consumed by metadata associated with the message, such as message properties and header values, can be accounted for in a similar way.

For example, the approximation calculation for a JMS TextMessage object of unknown size 201 can recognize that the object is comprised of a properties portion 202 and the data payload portion 203. A typical JMS TextMessage object 204 might be known to have a properties portion consisting of a fixed-size portion A, plus Z elements of a fixed size B, plus a variable-length string C and another variable-length string E, and if the payload itself is a character string of length E. From examination of the structure of similar JMS objects, a formula may be derived, such as:

JMS TextMessage object size=size of $A+(Z*$size of $B)+$(fixed overhead of string $C+$length of string $C)+$(fixed overhead of string $D+$length of string $D)+$(fixed overhead of string $E+$length of string $E$).

A modified version of the JVM with instrumentation for memory allocation techniques can contain an embodiment of the invention to establish the values of the fixed parts of the JMS TextMessage 205. This can simplify the approximation formula to:

JMS TextMessage size=size of $A+(Z*$size of $B)+$fixed overhead of string $C+$length of string $C+$fixed overhead of string $D+$length of string $D+$fixed overhead of string $E+$length of string $E=$constant size $K+$length of strings $C$, $D$, and $E$.

Having obtained these measurements, it is possible to know the memory allocation required for all fixed parts of the JMS TextMessage before run-time and the only related task needed at run-time can simply be querying the lengths of strings C, D, and E and inputting those values into the above formula 206. This last run-time calculation is quick, simple and has little impact on performance.

A similar technique can be used with regard to many other types of objects. As in JMS messages, even complex objects can be broken down into their fixed and variable portions and approximation calculations can be used to determine the size of a significant part of the object, limiting the analysis of the object itself to only the remaining parts. The embodiment thereby provides a method and system for optimizing memory cache utilization, which in turn increases system performance, while minimizing the performance costs associated with calculating the actual memory size required for copying or creating particular data or objects in memory.

Figure 3:
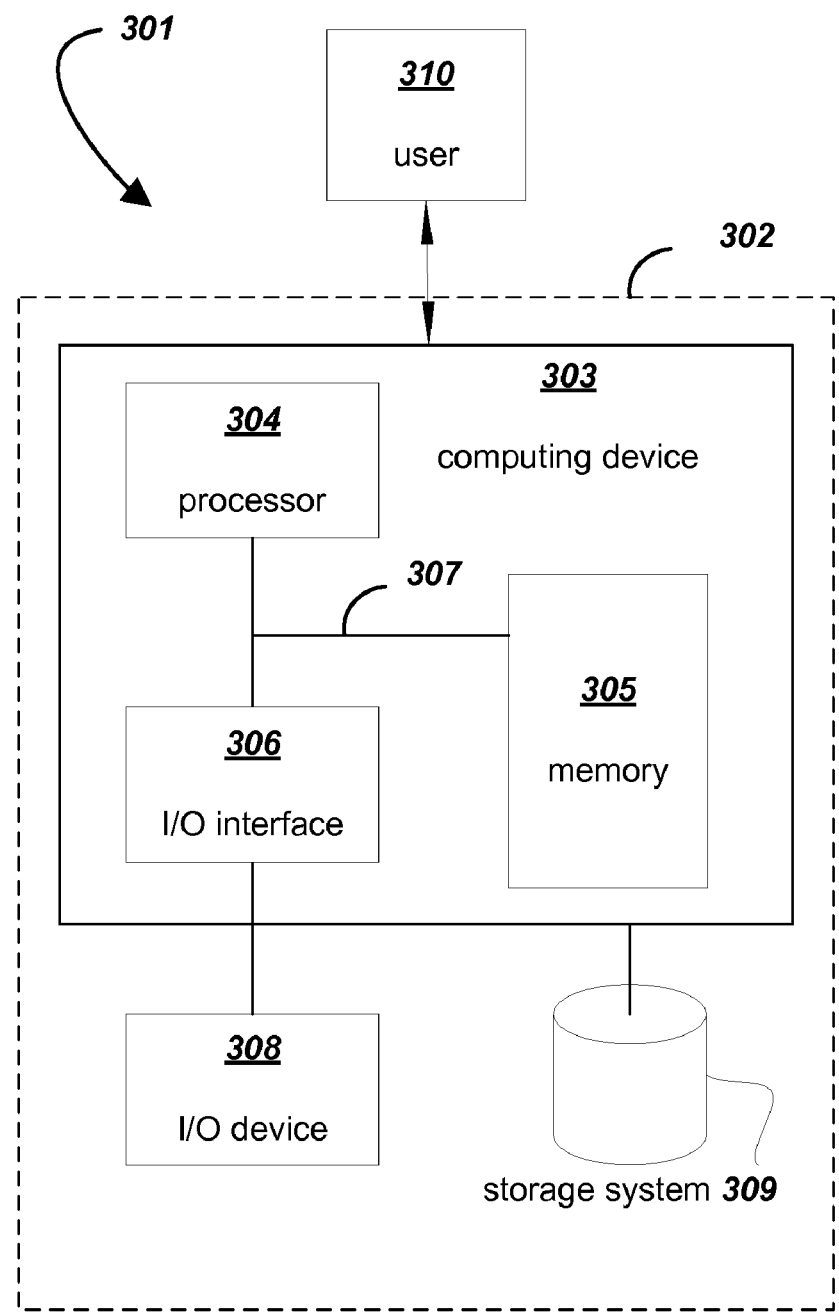
FIG. 3 shows an illustrative computer environment for managing the processes in accordance with an embodiment of the invention.

FIG. 3 shows an illustrative environment 301 for managing the processes in accordance with an embodiment of the invention. To this extent, the environment 301 includes a computer infrastructure 302 that can perform the processes described herein. In particular, the computer infrastructure 302 is shown including a computing device 303 operable to perform the processes described herein. The computing device 303 is shown including a processor 304, a memory 305, an input/output (I/O) interface 306, and a bus 307. Further, the computing device 303 is shown in communication with an external I/O device/resource 308 and a storage system 309. As is known in the art, in general, the processor 304 executes computer program code, which is stored in memory 305 and/or storage system 309. While executing computer program code, the processor 304 can read and/or write data to/from memory 305, storage system 309, and/or I/O interface 306. The bus 307 provides a communications link between each of the components in the computing device 303. The I/O device 308 can comprise any device that enables an individual to interact with the computing device 303 or any device that enables the computing device 303 to communicate with one or more other computing devices using any type of communications link.

The computing device 303 can comprise any general purpose computing article of manufacture capable of executing computer program code installed thereon (e.g., a personal computer, server, handheld device, etc.). However, it is understood that the computing device 303 is only representative of various possible equivalent computing devices that may perform the processes described herein. Similarly, the computer infrastructure 302 is only illustrative of various types of computer infrastructures for implementing the invention. For example, in one embodiment, the computer infrastructure 302 comprises two or more computing devices (e.g., a server cluster) that communicate over any type of communications link, such as a network, a shared memory, or the like, to perform the process described herein.

The memory allocation approximations described in the embodiment can be executed by a computing device 303 wherein a serialized representation of the object can be stored in the storage system 309 or received from other storage mediums or from a network via I/O interface 306 which is connected to the I/O device 308. Processor 304 can analyze the representation of the object to determine if the object can or should be deserialized and placed into a memory cache or data buffer in memory 305. An embodiment of the invention as described can be implemented to approximate the size calculations. This can increase overall system performance by decreasing the complexity and scope of the object analysis required by the processor 304 while retaining an optimal allocation of available memory 305.

What is claimed is:

1. A method for calculating memory size requirements of an object, comprising:
   receiving, by a computer, a new object that is to be stored in a memory cache,
   acquiring, by the computer, a known memory size of a similar object with at least one fixed size component,
   using, by the computer, the known memory size of the similar object to approximate a memory size required by the new object by determining that at least one fixed size component of the new object is equivalent in size to a respective fixed size component of the similar object,
   calculating, by the computer, an actual size of each of one or more variable sized components of the new object,
   approximating, by the computer, the total size of the new object using the known memory size of the similar object and the calculated actual size of the one or more variable sized components of the new object, and
   storing, by the computer, the new object in the memory cache if there is available space in the memory cache.

2. The method of claim 1, wherein the new object comprises a message.

3. The method of claim 1, wherein the one or more variable sized components comprises a plurality of variable length strings, each of the plurality of variable length strings comprising a first memory requirement having a fixed value associated with memory overhead for the string and a second memory requirement associated with a length of the string.

4. The method of claim 3, wherein calculating the actual size of each of the one or more variable sized components comprises calculating, for each of the plurality of variable length strings, a total memory size based on the first and second memory requirements of the string.

5. The method of claim 4, wherein approximating the total size of the new object comprises computing a sum of all calculated total memory sizes and adding the sum of all calculated total memory sizes to the known size of the similar object.

6. The method of claim 1, wherein the fixed size of the similar object is determined prior to run-time and the actual size of each of the one or more variable sized components of the new object is calculated at run-time.

7. The method of claim 1, wherein the similar object and the new object each comprise a first fixed size portion and at least one string, each string comprising a second fixed size portion and a variable size portion based on a length of the string,
   wherein the fixed size of the similar object comprises a sum of the first fixed size portion and the second fixed size portion of each string,
   wherein calculating the actual size of each of the one or more variable sized components comprises calculating the variable size portion of each string of the new object, and
   wherein the fixed size of the similar object is determined prior to run-time and the actual size of each of the one or more variable sized components of the new object is calculated at run-time.

8. A computer-readable tangible storage device having computer-readable program code embodied therein that, when executed by a processor, directs the processor to execute a method of calculating memory size requirements of an object, comprising:
   receiving a new object that is to be stored in a memory cache;
   acquiring a known memory size of a similar object with at least one fixed size component;

using the known size of the similar object to approximate a memory size required by the new object by determining that at least one fixed size component of the new object is equivalent in size to a respective fixed size component of the similar object;

calculating an actual size of each of one or more variable sized components of the new object;

approximating the total size of the new object using the known size of the similar object and the calculated actual size of the one or more variable sized components of the new object; and storing the new object in the memory cache if there is available space in the memory cache.

9. The computer readable tangible storage device of claim 8, wherein the new object comprises a message.

10. The computer readable tangible storage device of claim 8, wherein the one or more variable sized components comprises a plurality of variable length strings, each of the plurality of variable length strings comprising a first memory requirement having a fixed value associated with memory overhead for the string and a second memory requirement associated with a length of the string.

11. The computer readable tangible storage device of claim 10, wherein the calculating the actual size of each of the one or more variable sized components comprises calculating, for each of the plurality of variable length strings, a total memory size based on the first and second memory requirements of the string.

12. The computer readable tangible storage device of claim 11, wherein approximating the total size of the new object comprises computing a sum of all calculated total memory sizes and adding the sum of all calculated total memory sizes to the known size of the similar object.

13. The computer readable tangible storage device of claim 8, wherein the fixed size of the similar object is determined prior to run-time and the actual size of each of the one or more variable sized components of the new object is calculated at run-time.

14. The computer readable tangible storage device of claim 8, wherein the similar object and the new object each comprise a first fixed size portion and at least one string, each string comprising a second fixed size portion and a variable size portion based on a length of the string, wherein the fixed size of the similar object comprises a sum of the first fixed size portion and the second fixed size portion of each string, wherein calculating the actual size of each of the one or more variable sized components comprises calculating the variable size portion of each string of the new object, and wherein the fixed size of the similar object is determined prior to run-time and the actual size of each of the one or more variable sized components of the new object is calculated at run-time.

* * * * *